United States Patent [19]

Yasuda

[11] Patent Number: 5,048,072
[45] Date of Patent: Sep. 10, 1991

[54] STILL PICTURE TRANSMISSION DEVICE

[75] Inventor: Yoshinori Yasuda, Gumma, Japan

[73] Assignee: Mitsubishi Denki Kabushiki Kaisha, Tokyo, Japan

[21] Appl. No.: 563,899

[22] Filed: Aug. 7, 1990

Related U.S. Application Data

[63] Continuation-in-part of Ser. No. 307,472, Feb. 8, 1989, abandoned.

[30] Foreign Application Priority Data

Feb. 17, 1988 [JP] Japan .................. 63-034324

[51] Int. Cl.⁵ .................. H04N 7/12; H04N 7/14
[52] U.S. Cl. .................. 379/53; 358/85
[58] Field of Search .................. 358/85; 379/53

[56] References Cited

U.S. PATENT DOCUMENTS

| 4,258,387 | 3/1981 | Lemelson et al. | 358/85 |
| 4,291,198 | 9/1981 | Anderson et al. | 379/96 |
| 4,485,400 | 11/1984 | Lemelson et al. | 358/85 |
| 4,593,323 | 6/1986 | Kanda et al. | 379/100 |
| 4,701,946 | 10/1987 | Oliva et al. | 379/98 |
| 4,715,059 | 12/1987 | Cooper-Hart et al. | 379/53 |
| 4,739,413 | 4/1988 | Meyer | 358/141 X |
| 4,856,045 | 8/1989 | Hoshina | 379/53 |

FOREIGN PATENT DOCUMENTS

| 63-155890 | 6/1988 | Japan | H01N/7/14 |
| 63-217885 | 9/1988 | Japan . | |
| 2206767 | 1/1989 | United Kingdom | 379/53 |

Primary Examiner—Jin F. Ng
Assistant Examiner—Stella L. Woo
Attorney, Agent, or Firm—Rothwell, Figg, Ernst & Kurz

[57] ABSTRACT

A picture transmission unit having a detection circuit for detecting a tone signal, a header signal, or still picture data sent from the telephone circuit immediately before the still picture data are sent and recognizing the transmission of the still picture data, a memory for storing the still picture data temporarily, a sub-power source for always feeding power to the picture transmission unit and the memory in addition to a power supply device, a switching means for switching power from the power supply device automatically, and a main control and processing unit for controlling the whole apparatus is provided, in which when the detection circuit detects a tone signal, a header signal, or still picture data and recognizes the transmission of the still picture data, power from the power supply device is turned on to feed the whole apparatus and automatically display the still picture data stored in the memory on a display.

5 Claims, 5 Drawing Sheets

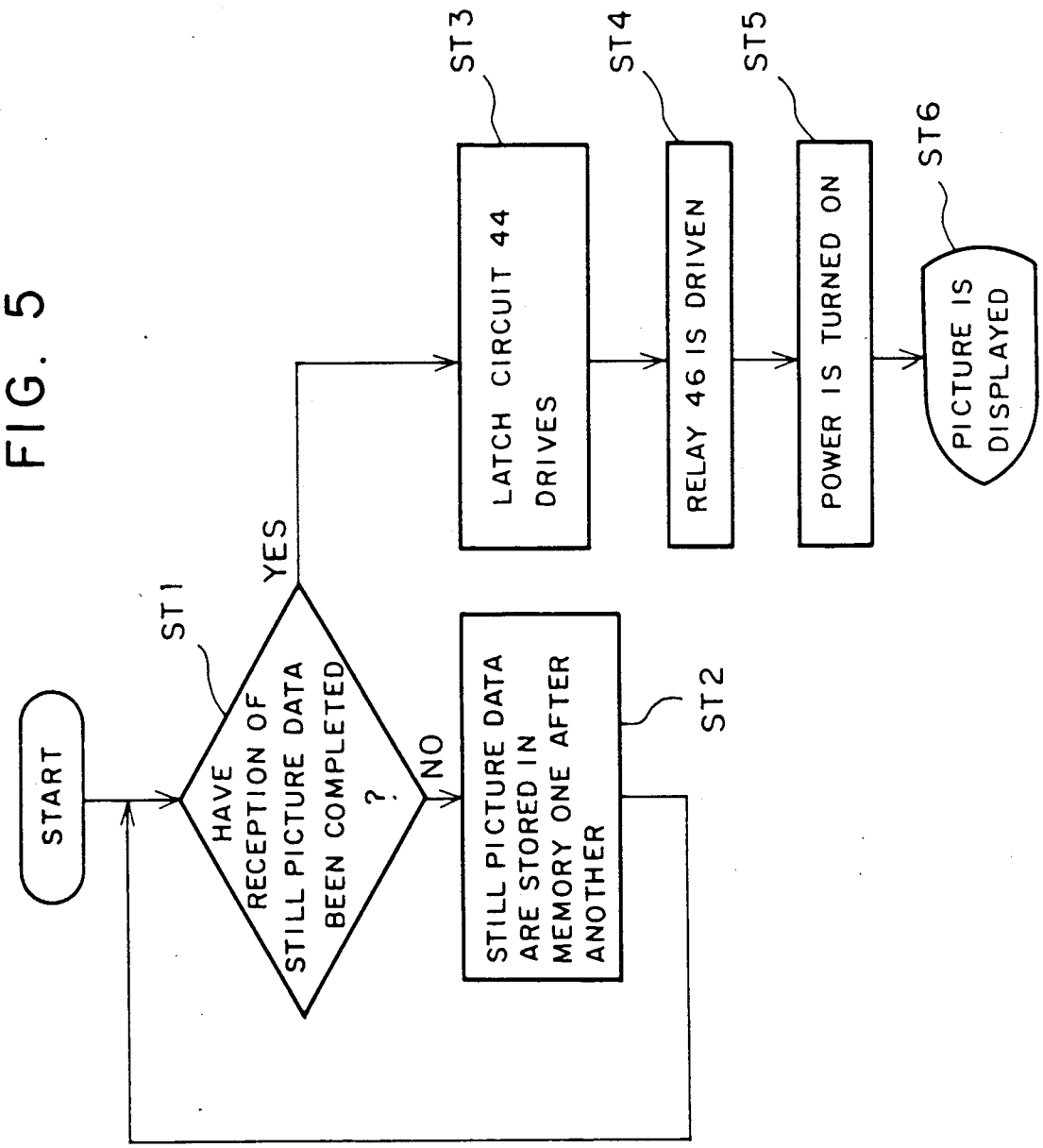

STILL PICTURE TRANSMISSION DEVICE

This is a continuation-in-part of application Ser. No. 07/307,472, filed Feb. 8, 1989, now abandoned.

BACKGROUND OF THE INVENTION

1. Field of the Invention

This invention relates generally to a still picture transmission device used by connection to a telephone circuit or a PBX (private branch exchange), and particularly to a power supply unit of a visual telephone.

2. Description of the Prior Art

As a conventional device of this kind, there has been available such a device as shown FIG. 1. FIG. 1 is a block diagram showing the basic configuration of a conventional still picture transmission device. In FIG. 1, numeral 1 is a telephone circuit, 2 is an externally equipped telephone, and 3 is an isolating transformer which is provided for isolation from DC, respectively. Numeral 40 is a picture transmission unit, a main control unit, and 6 is a pick-up camera which takes its own pictures (moving pictures). Numeral 7 is a picture control unit which controls selection of either still picture data of a remote station sent from the main control unit 50 or pictures (moving pictures) taken by the pick-up camera. Numeral 8 is a display. Numeral 9 is a transmission switch which performs switching for sending its own pictures (moving pictures) taken by the pick-up camera 6 as a still picture data to the telephone circuit 1. Numeral 10 is an AC adapter and converts a commercial AC 100 V power into DC power. Numeral 11 is a power switch and numeral 12 is a power supply device which supplies necessary power for the device together with the AC adapter 10 and the power switch 11.

The picture transmission unit 40 transmits and receives still picture data through the telephone circuit 1 based on commands from the main control unit 50, and modulates and demodulates still picture data by acting as a modem. The main control unit 50 prepares still picture data for transmission from pictures (moving pictures) developed by pick-up camera.

A still picture transmission device as shown in FIG. 1 needs to be installed at both a calling subscriber side and a called subscriber side.

Next, the operation of the device shown in FIG. 1 will be described. When a call (incoming) from the telephone circuit 1 occurs, the externally equipped telephone 2 informs of this using a ring-back tone. By the call, a called subscriber lifts up a receiver and allows the call from a calling subscriber to be answered.

When a called subscriber receives a message that a calling subscriber to be answered will transmit still pictures, after the called subscriber has confirmed that he has turned the power switch 11 on to apply power to the device, and the unit's own pictures (moving pictures) have been developed and monitored on a display 8, he informs the calling subscriber of completion for the preparation of allowing still picture data to be received. The calling subscriber receives this report and actuates the transmission switch 9 to transmit the still picture data. The still picture data transmitted to the called subscriber side through the telephone circuit 1 are demodulated via the isolating transformer 3 in the picture transmission unit 40 and sent to the main control unit 50. The main control unit 50 informs the picture control unit 7 of the reception of the still picture data. The picture control unit 7 changes-over its own pictures (moving pictures) which have just been transmitted by the camera 6 to the display 8, to the still pictures of this transmitted still picture data from the calling subscriber, and projects them on the display 8. When the still pictures are projected on the display 8, the called subscriber recognizes the reception of the still pictures and returns to the former conversation. When the conversation is completed, he hangs up the externally equipped telephone 2, and the operation ends.

Since the conventional still picture transmission device is configured as described above, even if the called subscriber starts conversation by picking up the receiver in response to a ring-back tone, he does not know whether the telephone on the calling subscriber side is provided with a still picture transmission device or not. Also, even if the caller's telephone is provided with the device, he does not know whether the calling subscriber has the intention of transmitting still pictures or not. Accordingly, he does not know that still pictures have been transmitted until the calling subscriber informs him of the transmission, and then turns power on from the power supply device 12. By this, he has to perform troublesome operation and furthermore, spend unnecessary time until he is able to receive the still pictures.

SUMMARY OF THE INVENTION

This invention was devised in order to solve such a problem. The object of this invention is to obtain a still picture transmission device which is capable of automatically receiving still picture data by driving its power supply device irrespective of the state of its power switch when still pictures have been transmitted even if the calling subscriber does not inform the called party of the transmission.

In order to achieve the above-mentioned object, a still picture transmission device according to this invention is equipped, in its picture transmission unit, with a detection circuit for detecting either a tone signal, a header signal sent through a telephone circuit immediately before still picture data are sent, or the still picture data itself. Furthermore, the picture transmission unit is always driven by a sub-power source which is continuously supplying power, and when the detection circuit detects a tone signal, a header signal, or still picture data, a circuit in the subpower source is operated to change-over a switching means, for example, a relay contact, to activate a driving power supply.

Accordingly, in this invention, when a tone signal, a header signal, or still picture data are detected, relay contacts are changed over, and the driving power source for the device is automatically turned on.

BRIEF DESCRIPTION OF THE DRAWINGS

FIG. 5 is a flow chart explanatory of the operation of the device according to the invention.

DETAILED DESCRIPTION OF THE PREFERRED EMBODIMENT

Figure 1:
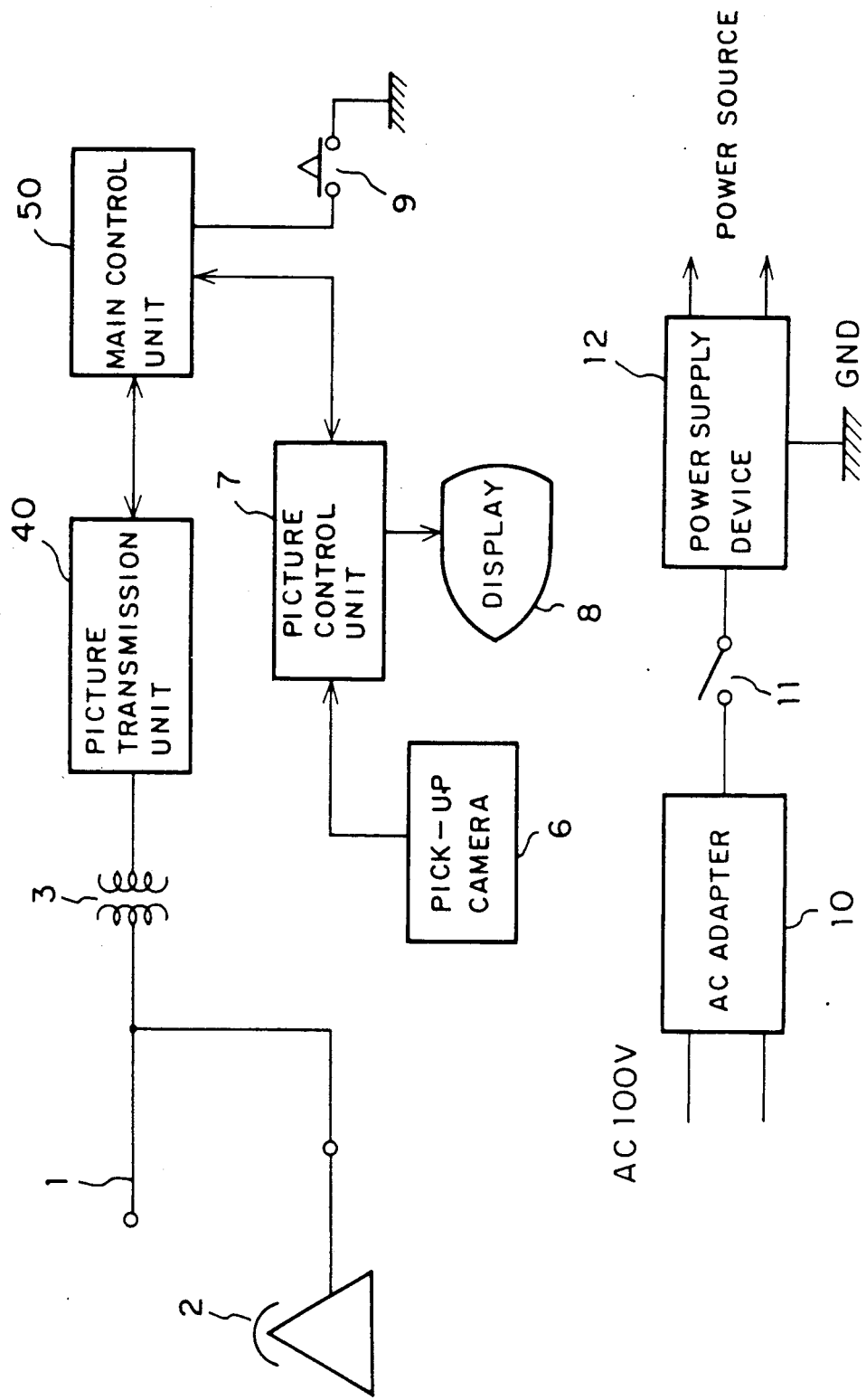
FIG. 1 is a block diagram showing an outline of a configuration of a conventional still picture transmission device.
Figure 2:
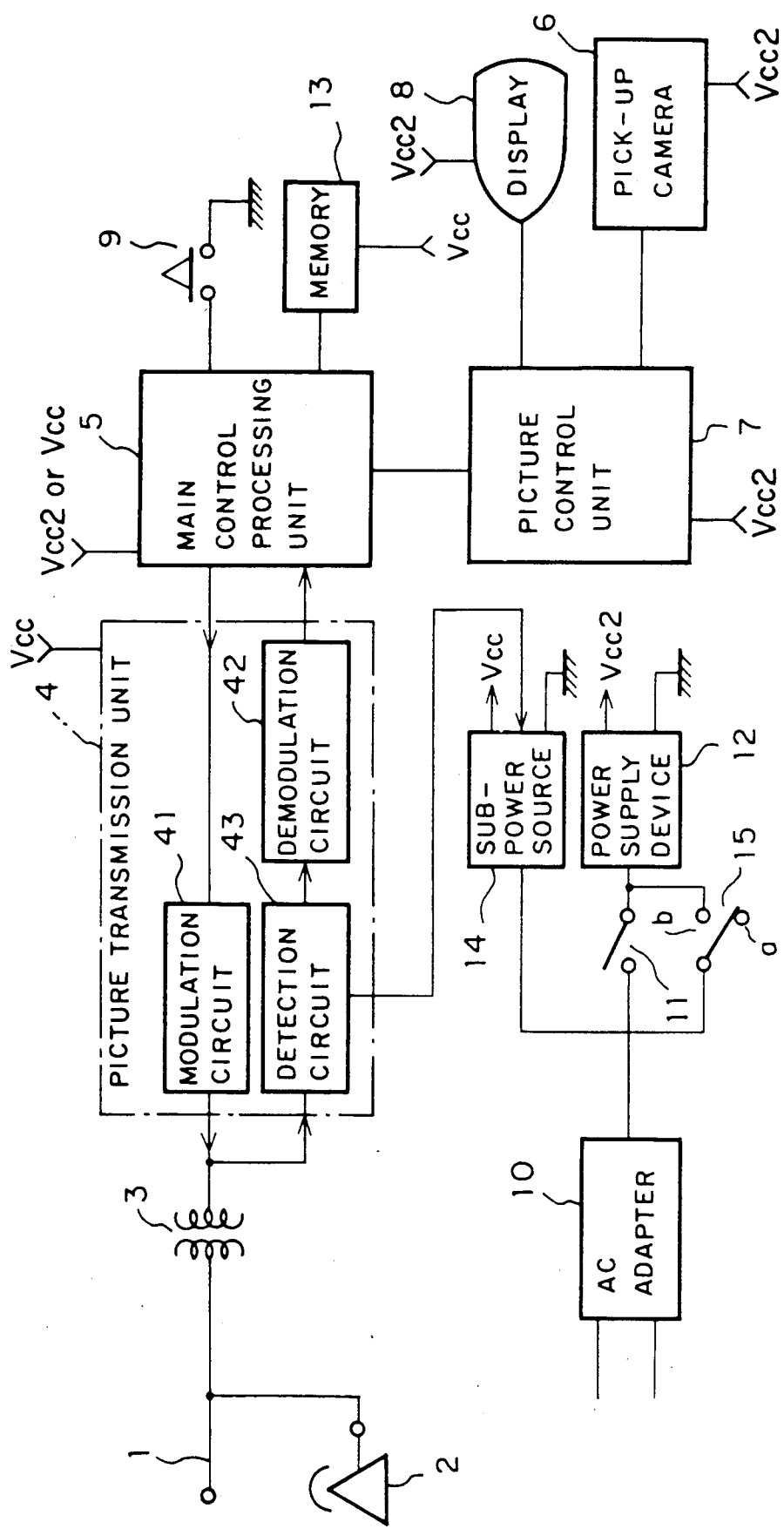
FIG. 2 is a block diagram showing an outline of a configuration of a still picture transmission device in an embodiment according to this invention.
Figure 3:
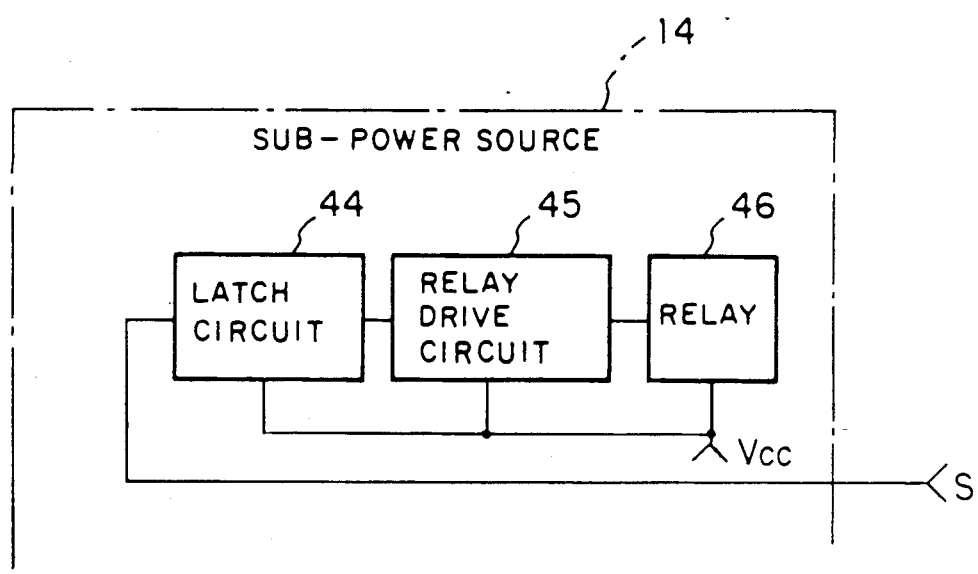
FIG. 3 is a block diagram showing a configuration of a sub-power source 14 according to this invention.

Hereinafter, an embodiment according to this invention will be described with reference to drawings. FIG. 2 is a block diagram showing an outline of a configuration of a still picture transmission device of this invention. In FIG. 2, the same numerals as those in FIG. 1 described above denote the same or identical parts. Numeral 4 is a picture transmission unit according to this invention, which comprises a modulation circuit 41, a demodulation circuit 42, and a detection circuit 43. Numeral 5 is a main control and processing unit. Numeral 13 is a memory for temporarily storing still pictures. The numeral 14 is a sub-power source, which comprises a latch circuit 44, a relay drive circuit 45, and a relay 46 as shown in FIG. 3. Numeral 15 is a relay contact.

The picture transmission unit 4 is provided between an isolating transformer 3 and the main control and processing unit 5 to modulate and demodulate still pictures and data and transmit and receive still picture data. The modulation circuit 41 performs fixed modulation in order to output data sent from the main control and processing unit 5 and still picture data to be sent to the remote side on a telephone circuit 1, and the demodulation circuit 42 is one for performing demodulation in order to restore still picture data which have been modulated and sent via the telephone circuit 1 to the original still picture data. The detection circuit detects, when still picture data are transmitted, a tone signal and a header signal sent before the still picture data.

The sub-power source 14 is a power supply device for always supplying power (Vcc) only to the picture transmission unit 4. As shown in FIG. 3, when an S signal from detection circuit 43 is detected, which informs that a tone signal or a header signal is detected, the signals is latched by a latch circuit 44, the relay drive circuit 45 is driven to operate the relay 46 and change-over the relay contact 15. A power supply device 12 is connected in parallel with a manual power switch 11 and the relay contact 15. Turnover of the relay contact 15 connects power supply device 12 to adapter 10 so as to supply power (Vcc 2) to circuits which are not applied with power from the sub-power source 14.

Figure 4:
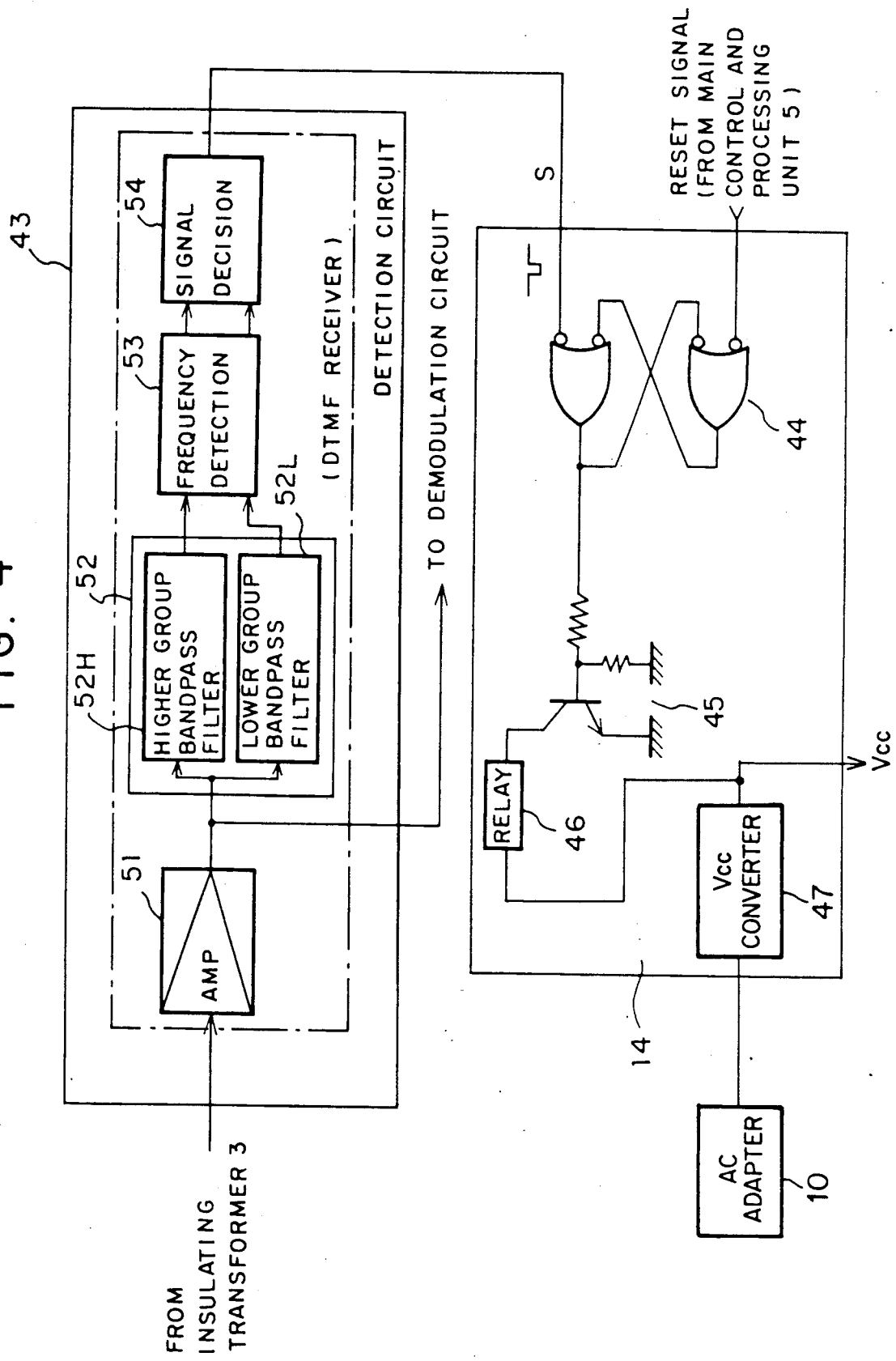
FIG. 4 is a circuit diagram showing examples of concrete configurations of a detection circuit 43 and a sub-power source 14.

FIG. 4 is a circuit diagram for explaining the sub-power source 14 and the detection circuit 43 in further detail Vcc power is supplied by Vcc converter 47. The latch circuit 44 in the sub-power source 14 is reset by a reset signal sent from the main control and processing unit 5. In this embodiment, an example of the detection circuit 43 in the case where a tone signal is sent from the telephone circuit 1 to recognize transmission of still picture data is shown. In this case, since the tone signal (PB signal) is sent in the form of a combination of single frequency signals of two kinds different in frequency among high group and low group frequencies, the detection circuit 43 is formed by a DTMF (DUAL TONE MULTI-FREQUENCY) receiver in order to detect such tone signal. The DTMF receiver comprises an amplifier 51 for amplifying a signal sent from the telephone circuit 1, via the isolating transformer 3, a bandpass filter 52 composed of a high group band filter (52H) and a low group bandpass filter (52L), a frequency detection circuit 53 for detecting a signal of a frequency of a combination of high group and low group frequencies from an output signal of the bandpass filter 52, and a signal decision circuit 54 for deciding the tone signal from the output signal of this circuit 53.

Next, the operation of the device shown in FIG. 2 will be described with reference to the flow chart in FIG. 5. When an incoming call from the telephone circuit 1 is generated, an externally equipped telephone 2 informs a called subscriber of this using a ring-back tone, and the called subscriber picks up the receiver of the externally equipped telephone 2 to start telephone communication. Here, a calling subscriber activates a transmission switch 9 of the still picture transmission device on the calling subscriber side, by which still picture data are transmitted via the telephone circuit 1 to the called subscriber side. A tone signal or a header signal is sent via the telephone circuit immediately before the still picture data are transmitted. The tone signal or the header signal is detected by the detection circuit 43, and a signal decision circuit 54 in the detection circuit 43 outputs an S signal as a pulse signal which informs that the above signal has been detected and sends the S output signal to the latch circuit 44 in the sub-power source 14. When the latch circuit 44 latches the S signal, it drives the relay drive circuit 45 using the processing of the step ST3. When the relay drive circuit 45 drives the relay 46 using the processing of the step ST4 to operate the relay 46. The relay contact 15 turns over from the a side to the b side, and power from the AC adapter 10 is supplied to the power supply device 12 by the processing of the step ST5. When power from the AC adapter 10 is supplied to the power supply device 12, power (Vcc 2) is output to automatically supply power to each circuit in the same way as when a called subscriber turns the power switch 11 on. Accordingly, the main control and processing unit 5 starts its operation, thereby storing the still picture data transmitted in the memory 13 backed up by the power source (Vcc), and at the same time, a direction is delivered to the picture control unit 7 and received still picture data are projected on the display 8 using the processing of the step ST6.

By wiring the main control and processing unit 5 so as to be driven by the power (Vcc) from the sub-power source 14, when still picture data have been transmitted, if the still picture data have been made to store once in the memory 13, the relay contact 15 has been turned over, and the power source has been turned on, and then the still picture stored in the memory 13 are made to project, the still picture data themselves allow control of the power supply device 12.

Furthermore, in the above embodiment, the power supply device is controlled by using a relay. The invention is not limited thereto, but the same effect can be obtained using a semiconductor circuit. Also, in the above embodiment, a relay contact is driven by detecting a tone signal or a header signal, but the still picture data themselves allow the power supply device to be driven by reducing the processing time for the device.

As described above, according to this invention, when a tone signal, a header signal, or still picture data themselves are detected, a relay contact 15 is turned over and a power source for driving the device is automatically turned on. Accordingly, the power source is not always needed to be turned on, and a calling subscriber can transmit still picture under his control. As a result, troubles in operation can be eliminated and there is no need to spend unnecessary time until still pictures can be received.

What is claimed is:

1. A still picture transmission device, comprising:
a picture transmission unit having a detection circuit for detecting a tone signal transmitted by a caller over a telephone circuit connected to said device immediately before transmission of still picture data and generating a detection signal in response to the detection of said tone signal;
a memory for temporarily storing said still picture data;
a main control processing unit for controlling storage of still picture data in said memory;
a sub-power source, connected to a main power source, for continuously providing power to said picture transmission unit and said memory;
a switchable power supply device for supplying power to said main control processing unit; and
switching means, responsive to said detection signal, for switching power to said power supply device from said main power source to automatically enable said still picture data to be received into said memory.

2. A still picture transmission device according to claim 1, wherein said switching means comprises a relay.

3. A still picture transmission device according to claim 1, wherein said detection circuit comprises an amplifier, a bandpass filter composed of a high group bandpass filter and a low group bandpass filter for making high group and low group frequency signals pass therethrough respectively, a frequency detection circuit for detecting a combination of said high group and low group frequency signals and outputting a signal in response thereto, and a signal decision circuit for generating said detection signal from the output of said frequency detection circuit.

4. A still picture transmission device according to claim 1, wherein said main control processing unit is driven by power from said sub-power source.

5. A still picture transmission device according to claim 1, further comprising:
a display unit for displaying still pictures represented by still picture data stored in said memory; and
a picture control unit for controlling said display unit;
each of said display and picture control units being supplied with power from said power supply device.

* * * * *

UNITED STATES PATENT AND TRADEMARK OFFICE
CERTIFICATE OF CORRECTION

PATENT NO. : 5,048,072
DATED : September 10, 1991
INVENTOR(S) : Yoshinori Yasuda It is certified that error appears in the above-identified patent and that said Letters Patent is hereby corrected as shown below:

```
Column 1, line 21, after "unit," insert
    --50 is--;
        line 28, delete "its";
        line 29, delete "own";
        line 42, after "camera" insert --6--;
        line 49, "this" should be --the call-- and
            delete "the";
        line 50, "call" should be --this--;
        line 53, delete "to be answered";
        line 58, "for" should be --of--;
        line 59, "of" should be --for--.

Column 3, line 27, delete "is one for"; and
    "performing" should be --performs--;
        line 29, after "1" insert a comma --,--;
        line 38, "signals" should be --signal S--;
        line 49, after "detail" insert a period --.--.

Column 4, line 10, "activates" should be --actuates--;
        line 26, "46. The" should be --46, the--.
```

Signed and Sealed this

Twelfth Day of October, 1993

*Attest:*

BRUCE LEHMAN

*Attesting Officer*     Commissioner of Patents and Trademarks